(12) United States Patent
Wilson

(10) Patent No.: US 11,149,876 B2
(45) Date of Patent: Oct. 19, 2021

(54) PIPELINE LAYING APPARATUS AND METHOD FOR CROSSING STEEP TERRAIN

(71) Applicant: Thomas Arthur Wilson, Houston, TX (US)

(72) Inventor: Thomas Arthur Wilson, Houston, TX (US)

(*) Notice: Subject to any disclaimer, the term of this patent is extended or adjusted under 35 U.S.C. 154(b) by 0 days.

(21) Appl. No.: 15/686,151

(22) Filed: Aug. 24, 2017

(65) Prior Publication Data

US 2018/0058608 A1    Mar. 1, 2018

Related U.S. Application Data

(60) Provisional application No. 62/379,198, filed on Aug. 24, 2016.

(51) Int. Cl.
| | |
|---|---|
| *F16L 1/036* | (2006.01) |
| *E02F 5/10* | (2006.01) |
| *F16L 1/06* | (2006.01) |
| *E02F 5/18* | (2006.01) |

(52) U.S. Cl.
CPC ............. *F16L 1/036* (2013.01); *E02F 5/10* (2013.01); *E02F 5/18* (2013.01); *F16L 1/06* (2013.01)

(58) Field of Classification Search
CPC ..... F16L 1/06; F16L 1/036; E02F 5/10; E02F 5/15
See application file for complete search history.

(56) References Cited

U.S. PATENT DOCUMENTS

2012/0230771 A1* 9/2012 Farley ................. B23P 19/02
405/184

* cited by examiner

*Primary Examiner* — Tara Mayo-Pinnock
(74) *Attorney, Agent, or Firm* — Andrew P. Tower, Esq.

(57) ABSTRACT

A pipeline is assembled traversing steep terrain by digging a trench down an incline, assembling pipe joints together in proximity to the incline, and then using equipment to push and/or pull the assembled pipe joints down the incline and through the trench while the pipeline is suspended above the bottom of the trench. A series of connected sleds are used to partially carry the load of the assembled pipeline, keep it off the bottom of the trench until it is in place, and permit the installation of supports under it prior to backfilling.

5 Claims, 15 Drawing Sheets

PIPELINE LAYING APPARATUS AND METHOD FOR CROSSING STEEP TERRAIN

CROSS-REFERENCE TO RELATED APPLICATIONS

This application claims priority to U.S. Provisional Patent Application Ser. No. 62/379,198, filed on Aug. 24, 2016.

BACKGROUND OF DISCLOSURE

Technical Field

The present invention provides an improved method and system for laying pipelines across steep terrain.

Related Technology

Pipelines continue to be the most cost-effective means of transporting large and steady amounts of liquids, gases and mixtures across long distances. Although capital intensive to build, once constructed pipelines are relatively economic to operate and provide an environmentally advantageous and safe method of transportation. Constructing pipelines traversing mountainous or steep terrains, as opposed to across relatively flat land, remains slow, dangerous and difficult work, and carries a substantially high cost. Therefore, improved techniques and equipment that increase the speed, safety and cost efficiency of pipelining across steep terrains are needed.

The conventional method of laying pipelines down steep terrains is to first clear timber and other vegetation from the designated right-of-way either by hand with power saws and/or with heavy equipment (i.e. hydraulic excavators or bulldozers), working down the incline and tethered by a cable connected to either a stationary winch secured at the top of the incline and/or a winch attached to additional equipment located on the incline. The cable and winch are used to keep the equipment under control and from sliding down the slope.

Once the designated right-of-way is cleared of trees and underbrush, the same or similar equipment is used to "grade" the right-of-way. Grading the right-of-way is essentially leveling it from side to side so that the slope is either constant or at least flattened and devoid of humps or bellies. This grading may also involve blasting and/or rock drilling in rocky slopes.

After the "grade" work is complete an excavator is used to excavate a trench down the slope where the pipeline will be placed. The trench is normally dug from top to bottom with the "spoil" from the trench being placed on the opposite side of the right-of-way from where the pipeline construction equipment will be working. Alternatively, it can be dug from bottom to top, but in that case the excavator could have to make an additional trip down the slope to "crumb" or cleanout any debris from the trench from the material rolling down the incline as the excavator bucket is emptied.

Once the trench is complete, each joint of pipe is placed in the trench and welded together in one or more joint sections starting at the base of the incline and working upslope to the top of the incline. The pipe joint/double-joint pipe sections are carried by side booms or cranes up the slope. Each side boom is connected to a stationary winch or another piece of equipment heavy enough to prevent the side boom from sliding down the slope. While the side booms support the pipe, welders and other laborers have to enter the open trench and nearby area to make the welds and coat the field joints in the previously excavated trench. The laborers are typically protected from falling debris by some form of sheeting or trench box. After a successful NDT (non-destructive test) and/or x-ray inspection of the weld, the pipe joint is coated and then backfilled to prevent debris further up the slope from falling down and damaging the pipe's protective coating and to anchor the pipe. This process is repeated up the slope. Depending on the length and steepness of the slope and the diameter of the pipe it can take several days to progress a few hundred feet.

The foregoing process of laying pipelines on sloping terrain is inefficient, time-consuming, labor intensive, and involves great hazards to people and equipment working on inclined slopes and in the trench. There exists a need for more practical processes and systems to expedite as well as increase safety while pipelining on sloping terrain.

SUMMARY OF INVENTION

An object of the invention is to speed the process and reduce the exposure of laborers and equipment operators to the dangers of working on a severe slope.

Another object of the invention is to reduce the number of laborers required on the incline or in or around the open trench. An important advantage of the invention is that the work in assembling, welding together, inspecting and coating the pipe sections is done at the location of the pipeline apparatus at a position on the incline or at or near the top of the incline, and not in the trench, which vastly improves safety conditions for persons and equipment.

Another important advantage of the invention is that allows for efficient installation of pipelines using pushing and/or pulling equipment to slide the assembled pipeline down the pipeline trench via a series of sleds or sleds with wheels attached.

A further advantage of the invention is that the process can be accomplished by welding one joint at a time or multiple joints at a time. For smaller diameter pipelines, it could be utilized to lower the entire pipe section down the slope.

These and other objects and advantages of the invention will become more fully apparent in the further description, accompanying drawings and appended claims.

SUMMARY OF DRAWINGS

Some embodiments of the present invention are illustrated as an example and are not limited by the figures of the accompanying drawings, which are incorporated in and constitute a part of the specification. These drawings, together with the general description of the invention given above and the detailed description of the preferred embodiments given below, serve to explain the general principles of the invention.

DETAILED DESCRIPTION OF THE DISCLOSURE

FIGS. 1-24, illustrate preferred embodiments for a pipeline laying method and apparatus for traversing steep terrain. FIGS. 1-13 illustrate the basic pipeline laying method disclosed by the invention as discussed below. FIGS. 14-24 illustrated preferred embodiments of the components of the pipeline apparatus as disclosed by the invention as discussed below.

This detailed description is organized into two sections: first, a discussion of the basic pipelining method, and second, a more detailed discussion of the preferred embodiments of individual components of the pipeline laying apparatus disclosed by the invention.

Throughout this disclosure, components and features of the disclosed invention may be discussed with reference to more than one illustration. A particular component or feature is given the same numeral throughout this disclosure and the accompanying illustrations.

I. Method of Laying Pipeline on Steep Inclines

Figure 1:
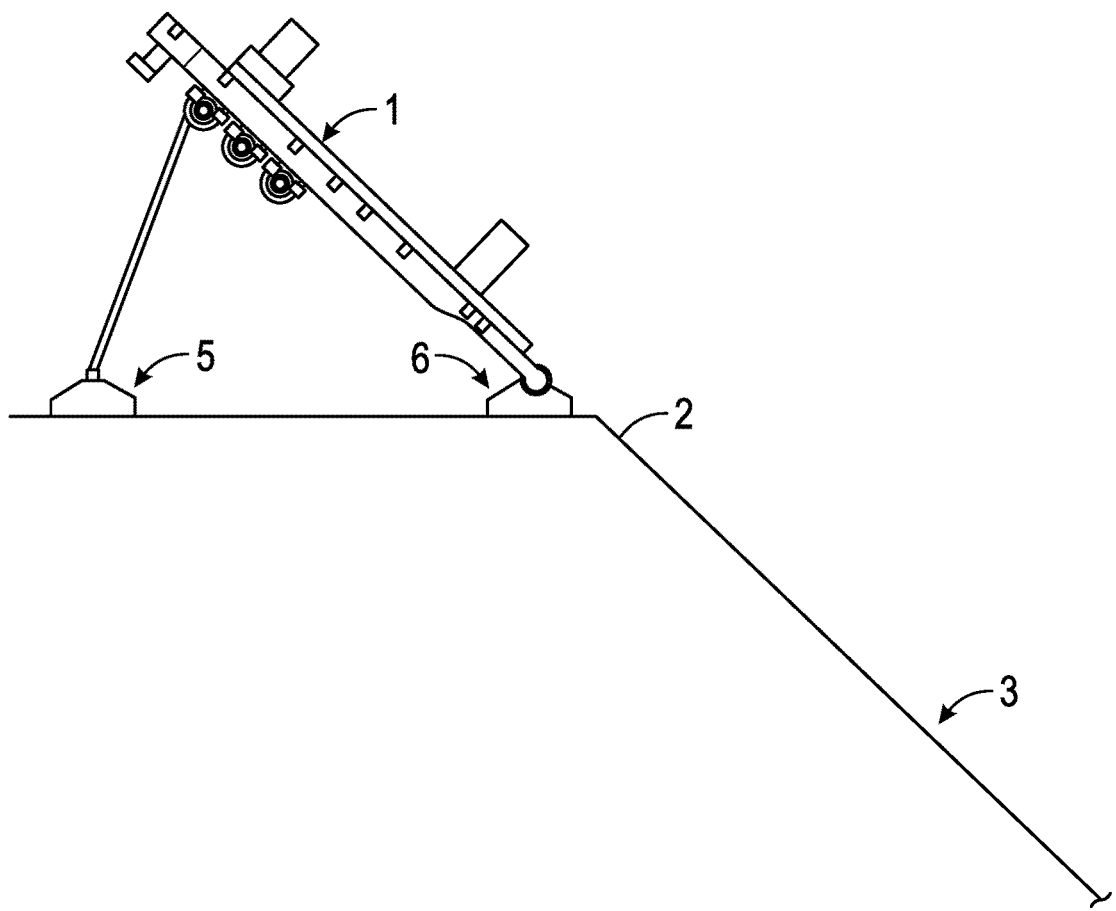
FIG. 1 shows a side view of an embodiment of the pipeline moving apparatus as located at the top of an incline.

Referring to FIG. 1, prior to beginning pipeline laying operations, the contractor or operator will locate and secure the pipe moving apparatus 1 and any ancillary equipment (such as power units, side booms and cranes for pipelining operations (not shown)) and joints of pipe (not shown) at a desired position adjacent to or near the top of the incline 2 of the sloping terrain 3 to be traversed.

Figure 2:
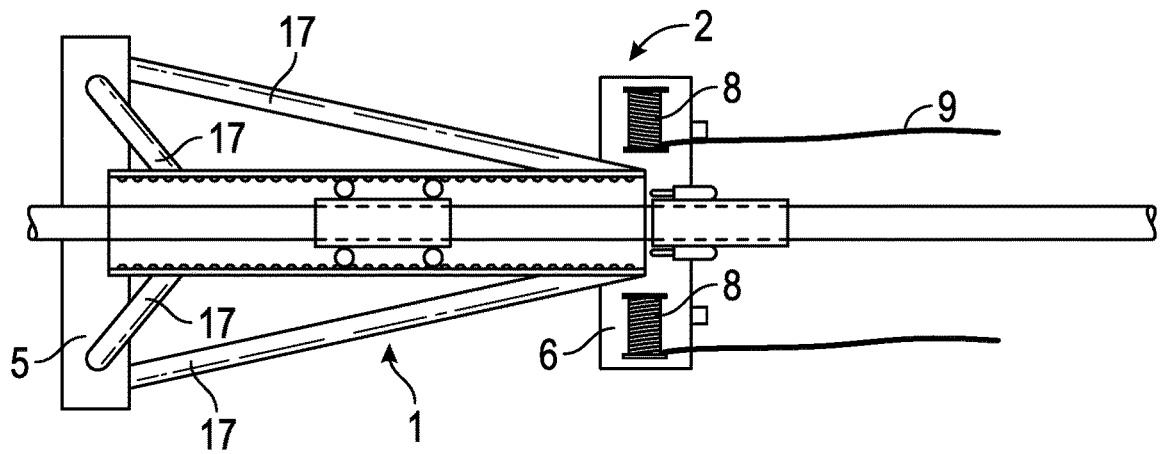
FIG. 2 shows a top view of an embodiment of the pipe moving apparatus located adjacent to the top of a slope over a trench.

As shown in FIG. 2, the ends of the pipe moving apparatus 1 are secured to the ground at the top of the incline 2 via deadman or similar supports cast into the ground (5 and 6).

Figure 3:
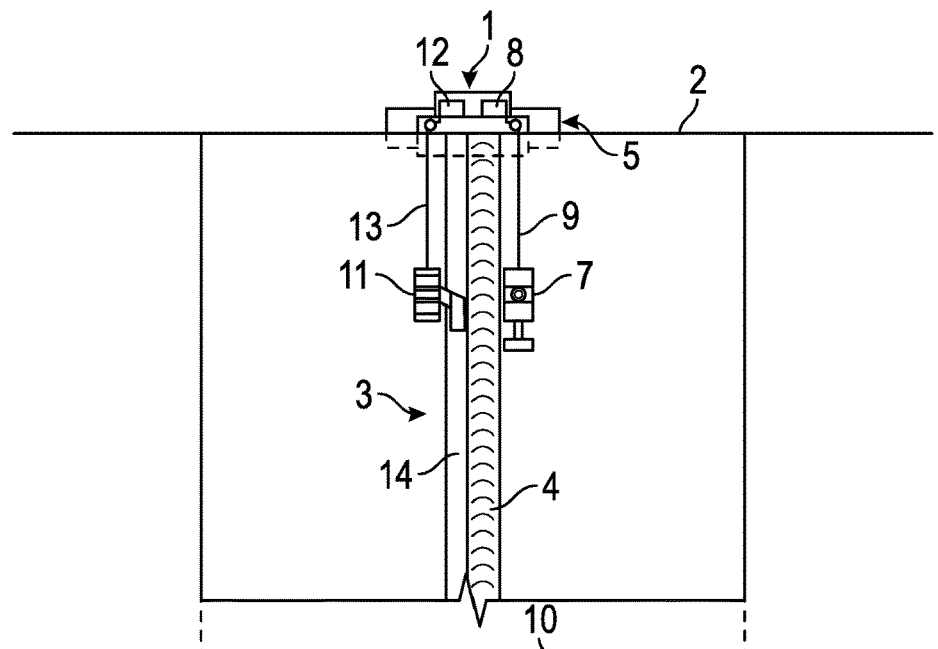
FIG. 3 shows a frontal view of a pipelining operation on a slope showing the right-of-way and trench with an embodiment of the pipe moving apparatus located at the top of a slope and beginning operations.

As shown in FIG. 3, heavy equipment such as bulldozers or earth moving machines 7 that may be secured to the pipe moving apparatus 1 via winches 8 and cables 9 are used to a clear and grade a right-of-way 10 to provide a straight and level path extending down the incline 2 for laying a pipeline. After the "grade" work is complete, an excavator 11 which may also be secured to the pipe moving apparatus 1 via additional winches 12 and cables 13 is used to excavate a trench 14 down the right-of-way 10 where the pipeline will be placed. A spoil 4 is left on the side of the trench which may be used for backfilling. The width and depth of the trench 14 are determined based upon the terrain and size of pipeline to be installed and to accommodate the other components of the invention, including the sleds. Although the trench 14 is illustrated extending generally straight down the sloping terrain 3, it will be appreciated that the trench 14 may be curved horizontally along the surface of the terrain 3 or bowed vertically to some degree to accommodate the curvature of the slope. However, because of the stiffness of the pipeline, special care should be taken in clearing the right-of-way 10, and digging the trench 14 to avoid any abrupt curves or changes in slope.

Figure 4:
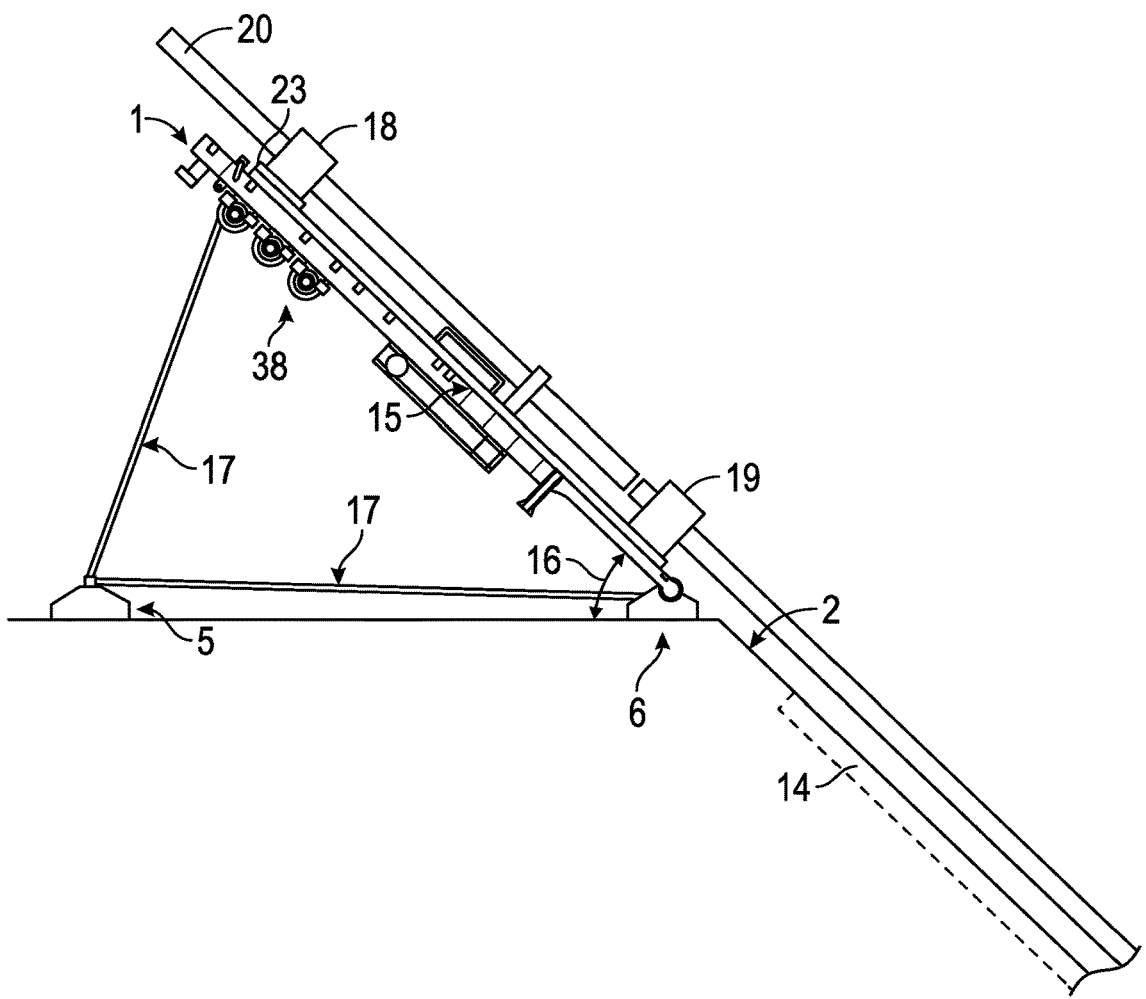
FIG. 4 shows a more detailed side view of the pipe moving apparatus located in position at the top of an incline.

Referring to FIGS. 3 and 4, the function of the pipe moving apparatus 1 is to propel and guide movement of the pipeline down the incline 2 and through the trench 14. The dimensions and weight of the pipe moving apparatus 1 may vary according to the size of pipeline that is being installed.

As shown in FIG. 4, the first operation is to raise the frame 15 of the pipe moving apparatus 1 to the appropriate angle 16 in relation to the top of the incline 2 to match the slope of the incline of the trench 14. In one embodiment, the angle 16 of the frame 15 with respect to the slope of the incline of the trench 14 can be adjusted using a suitable control system (not show) utilizing a hydraulic cylinder system (not shown) or crane (not shown) to raise one end of the frame 15 and secured it in place by one or more braces 17 attached to frame 15 and the deadman or similar supports cast in the ground (5 and 6). The hydraulic cylinder system may include an internal combustion engine or electric motor driving a hydraulic pump, hydraulic lines and valves (not shown). This disclosure is expressly not limited to any particular mechanism or method by which the frame 15 may be raised. Once the frame 15 is in place and secured by one or more braces 17, the pipe moving apparatus 1 utilizes a plurality of clamps, including at least an upper clamp 18 and a lower clamp 19 to grip and hold a joint of pipe 20, and at least an upper clamp carriage 23 to move the joint of pipe 20 co-linearly with respect to the frame 15. In one embodiment, the upper clamp 18 and lower clamp 19 are capable of being opened to allow ease of insertion of pipe joints in addition to being capable of accepting pipe joints that are threaded through the clamps. The upper clamp carriage 23, which holds the upper clamp 18, is capable of both pushing and pulling joints of pipe 20 and/or an assembled pipeline with respect to the pipe moving apparatus 1 and the sloping terrain 3. The actuation of the clamps 18 and 19 and movement of the upper clamp carriage 23 is accomplished through use of known methods and equipment, including hydraulic systems and rack and pinion devices as will be in Section II below.

FIGS. 5-11 provide further detail of the operation of the pipe moving apparatus 1.

Figure 5:
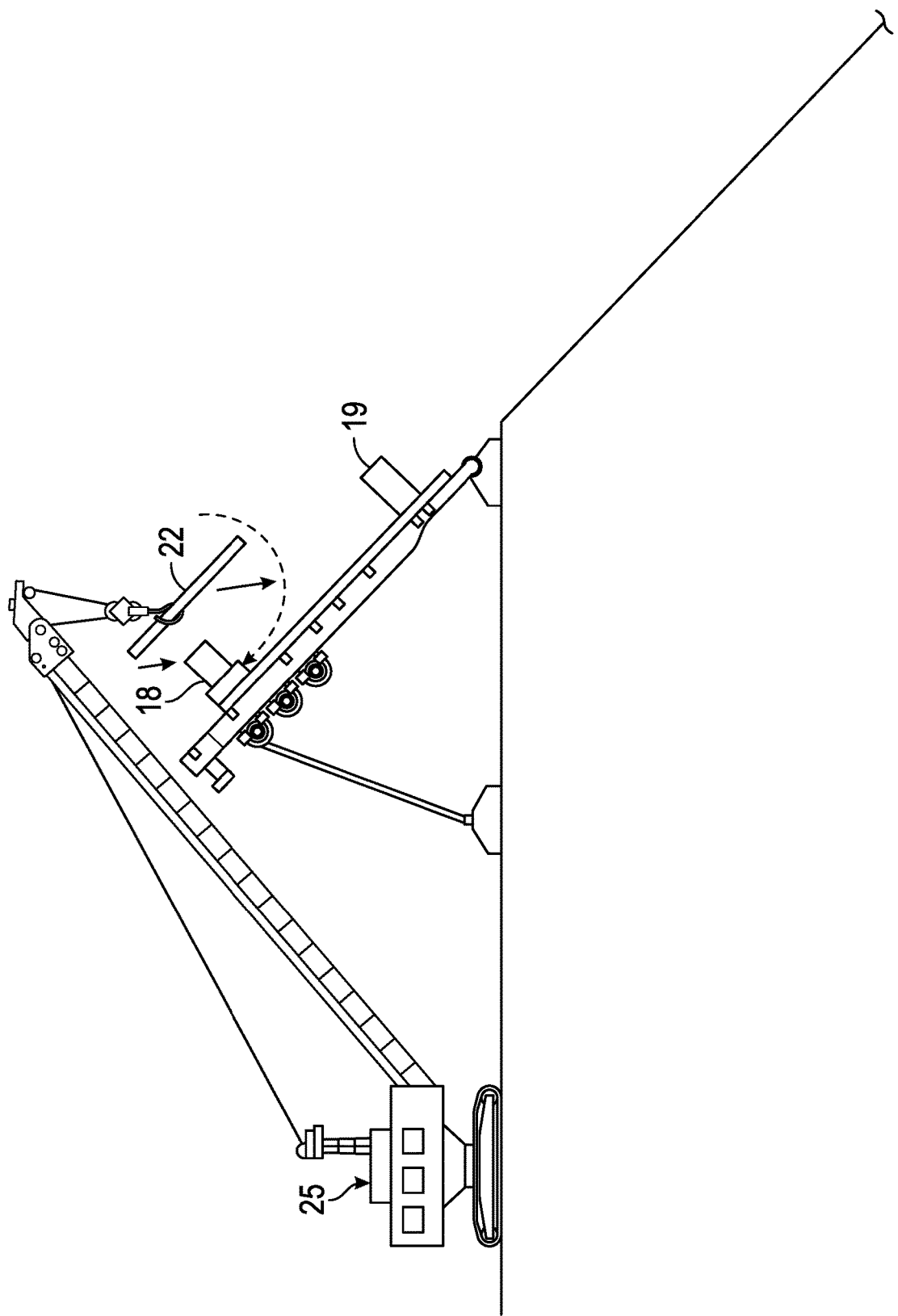
FIG. 5 shows a side view of an embodiment of the pipelining operation of the invention, showing the pipe moving apparatus in position and a first pipe joint being lowered into position into an upper clamp.

As illustrated in FIG. 5, a first joint of pipe 22 (or multiple joints of pipe previously welded together) is raised by a crane, "deckhand", side boom or other lifting equipment 25 to a position above the frame 15 and inserted into the upper clamp 18. Alternatively, a first joint of pipe 22 may have been inserted into the upper clamp 18 prior to the time the frame 15 was raised to the angle 16 with respect to the slope of the incline. Once the first joint of pipe 22 is inserted into the upper clamp 18, the upper clamp 18 is activated to grip the first joint of pipe 22 using a suitable control system (not shown).

Figure 6:
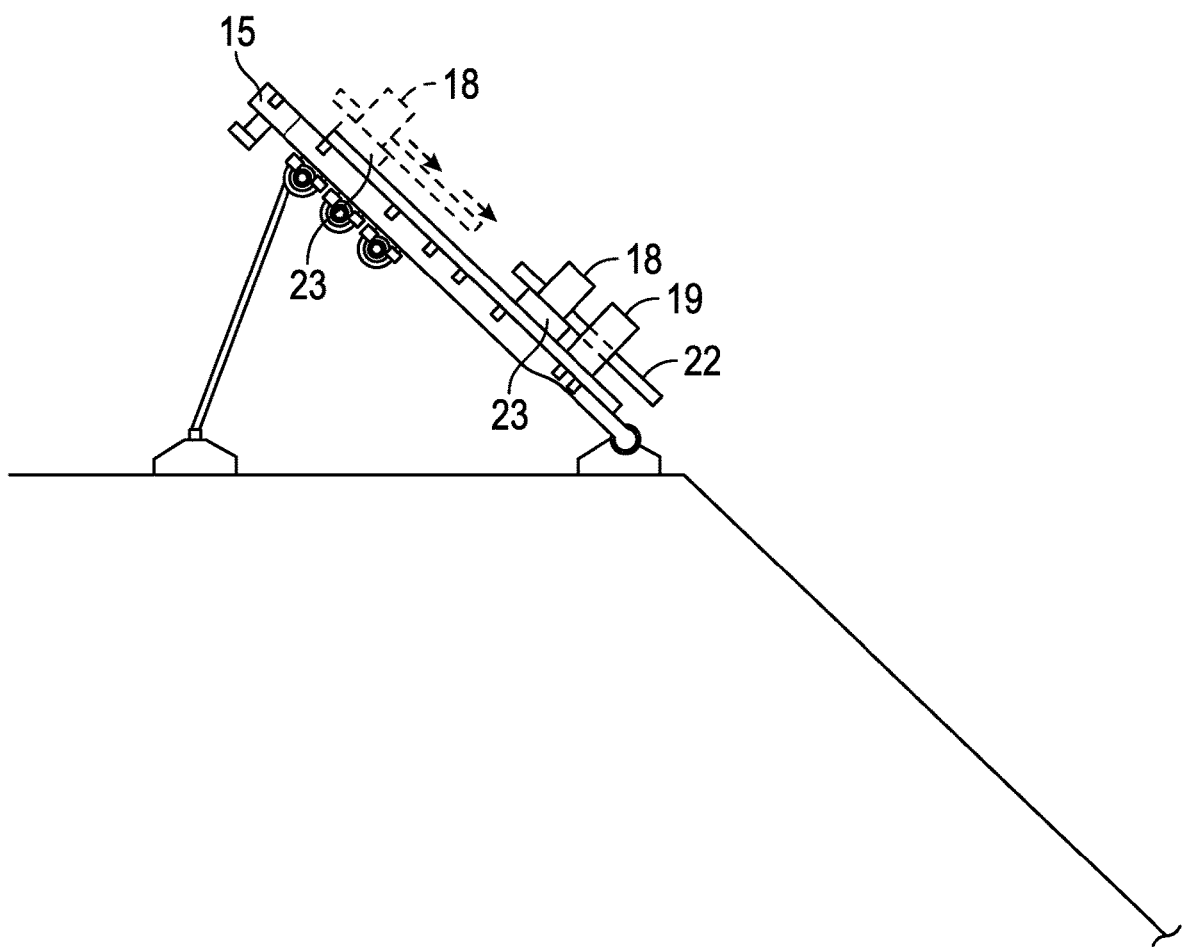
FIG. 6 shows a side view of an embodiment of the pipelining operation of the invention, showing an upper clamp engaged and the clamp carriage pushing a pipe section through an unengaged lower clamp.

As illustrated in FIG. 6, while the upper clamp 18 is activated to grip and hold the first joint of pipe 22, the upper carriage 23, to which the upper clamp 18 is attached, is activated such that it is propelled coaxially down the frame 15 with the first joint of pipe. As the upper carriage 23 holding the first joint of pipe 22 via the upper clamp 18 travels down the frame 15 the lower end of the first joint of pipe 22 passes through the opening of the lower clamp 19 located at the lower end of the frame 15. Once the upper carriage 23 reaches a position close to the lower clamp 19 it stops. The lower clamp 19 is then activated using a suitable control system (not shown) to grip and hold the first joint of pipe 22.

Figure 7:
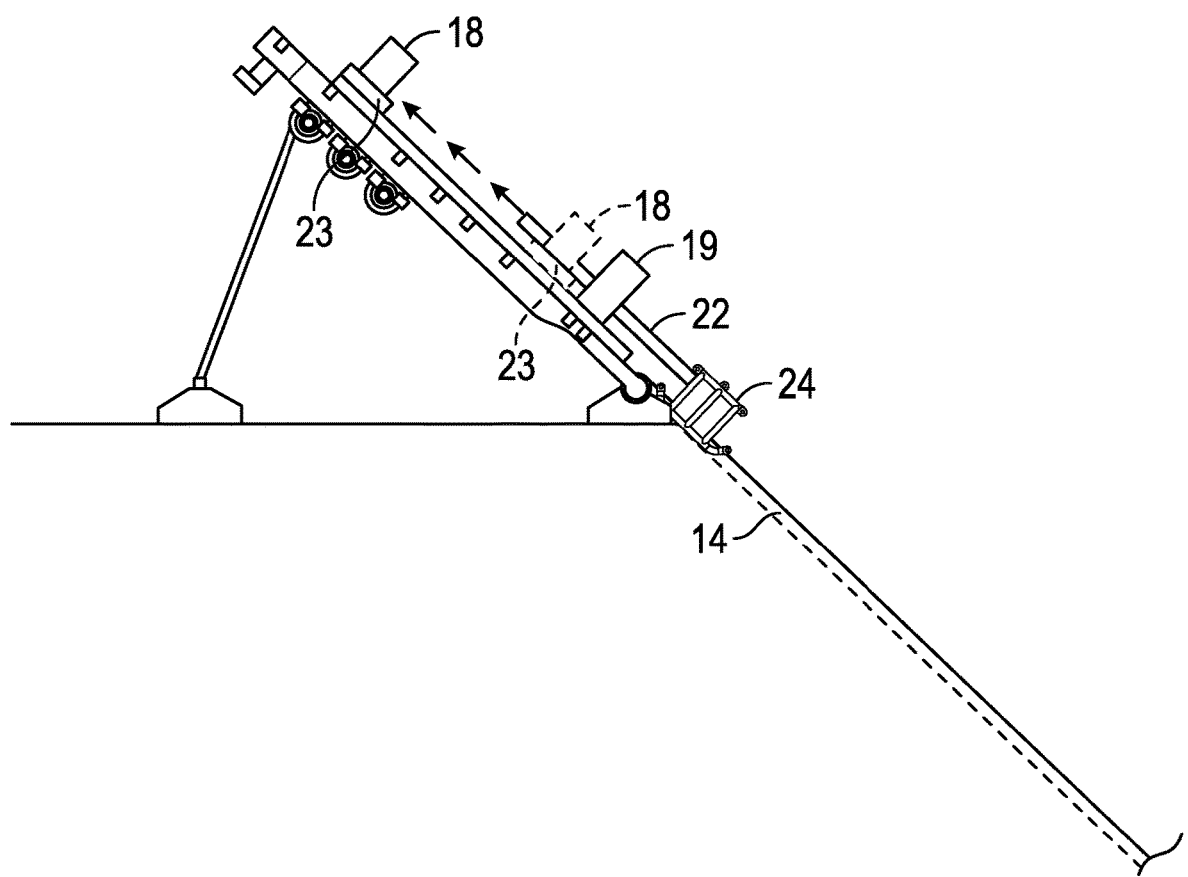
FIG. 7 is a side view of an embodiment of the pipelining operation of the invention, showing a lower clamp engaged on the pipe, the upper clamp released, and the first carriage returning to its original position to accept another section of pipe.

As illustrated in FIG. 7, while the lower clamp 19 is activated to hold the first joint of pipe 22, the upper clamp 18 releases its grip on the first joint of pipe 22 and the upper carriage 23 is activated such that it moves coaxially back up the frame 15 to return to its original position to receive another joint of pipe. It will be noted that an upper end of the first section of pipe 22 extends out from the lower clamp 19 after the upper clamp 18 is released. At this time, a pilot sled 24 may be attached to the lower end of the first section of pipe 22 while it extends into the trench 14. Alternatively, the pilot sled 24 may be attached to the first section of pipe 22 at a later time after several sections of pipe are joined together.

Figure 8:
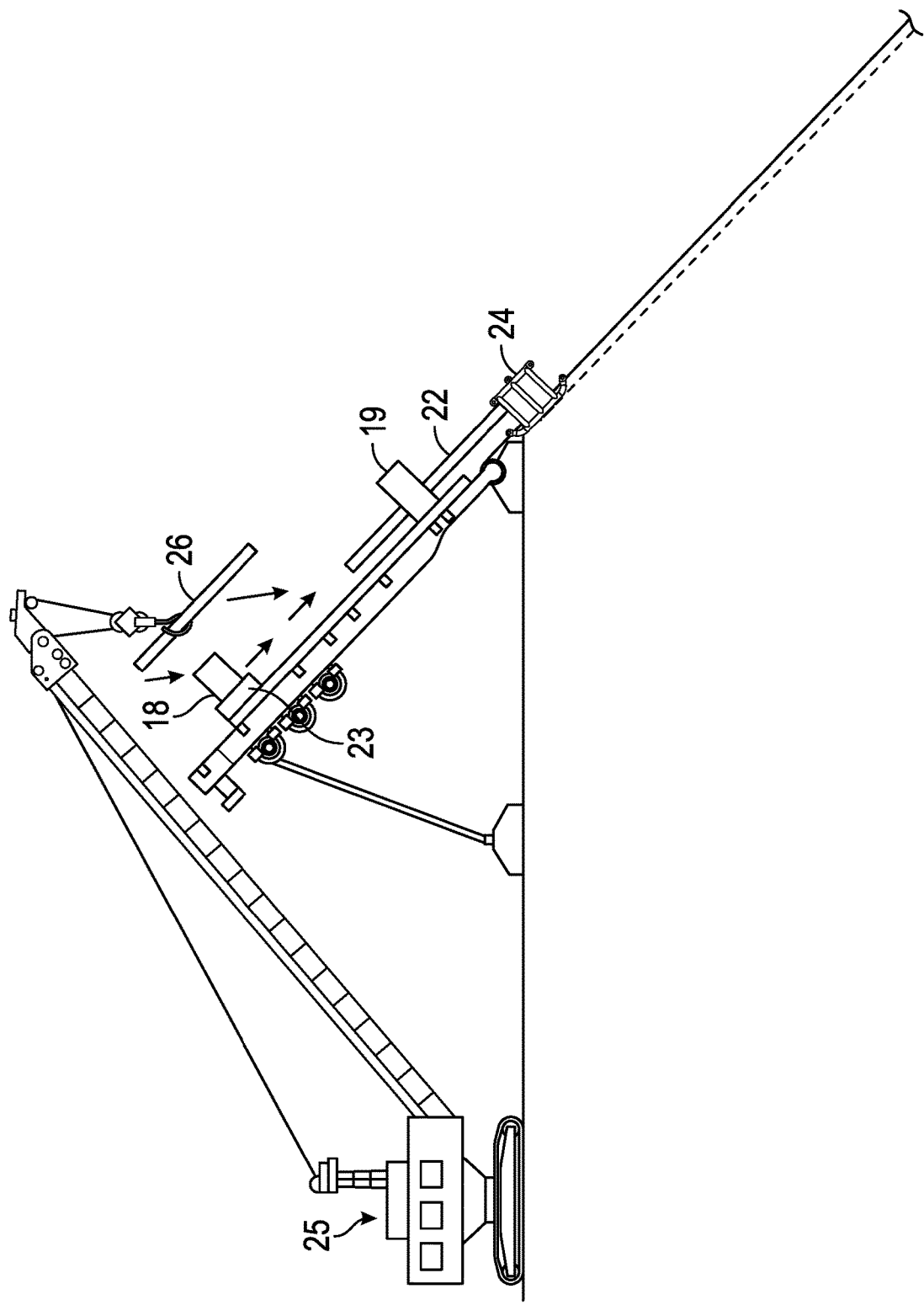
FIG. 8 is a side view of an embodiment of the pipelining operation of the invention, showing the pipe moving apparatus in position and a second pipe joint being lowered into position into an open upper clamp and positioned to abut the first joint of pipe.
Figure 9:
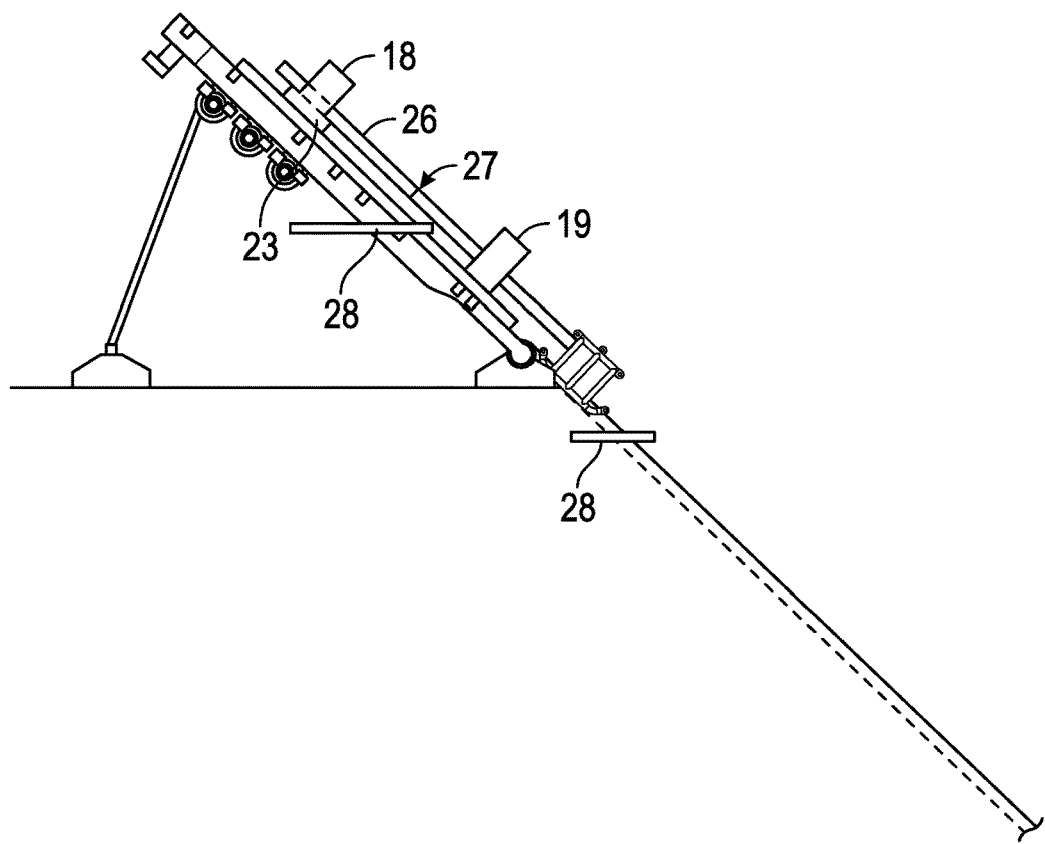
FIG. 9 is a side view of an embodiment of the pipelining operation of the invention, showing both first and second joints of pipe abutting and laborers performing welding, inspection, x-ray and coating operations on platforms.

As illustrated in FIG. 8, while the lower clamp 19 is activated to hold the first section of pipe, a second section of pipe 26 is raised by a crane, "deckhand", side boom or other lifting equipment 25, placed in the open upper clamp 18 and positioned abutting the first joint of pipe 22 as further illustrated in FIG. 9. Alternatively, the upper clamp 18 and upper carriage 23 may be activated to move the second section of pipe 26 into a position abutting the first joint of pipe 22. Welders fit and weld the first and second pipe joints (22 and 26) together in accordance with the pipeline engineer's applicable specifications. This may require first lining up the pipe joints (22 and 26) while the upper clamp 18 is deactivated. While the first and second pipe joints (22 and 26) are in this position on the frame 15, inspection, x-ray and coating of the "butt" weld 27 joining the pipe joints (22 and 26) can be accomplished before moving the conjoined pipe. In one embodiment, these activities (e.g. x-ray and coating, etc.) can occur down the slope from the lower clamp 19 below the frame 15. As shown in FIG. 9, worker platforms 28 may be attached to the pipe moving apparatus 1 at locations where these operations occur.

Figure 10:
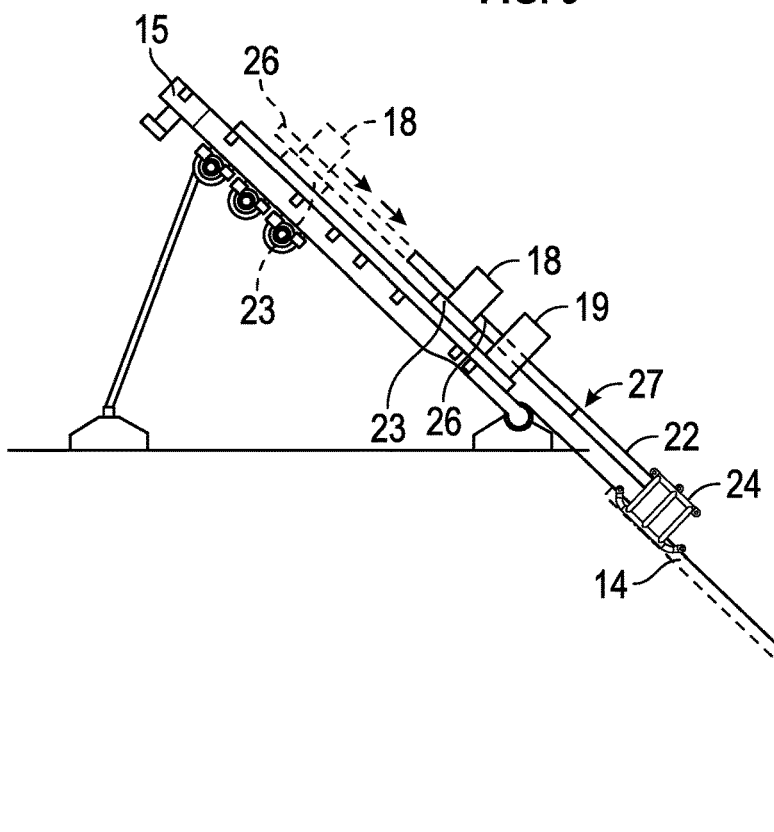
FIG. 10 is a side view of an embodiment of the pipelining operation of the invention, showing several connected sections of pipe being pushed down an incline by the pipe moving apparatus.

As illustrated in FIG. 10, once the butt weld 27 is completed, the upper clamp 18 is activated to grip the now conjoined first and second pipe joints (22 and 26) and the lower clamp 19 is deactivated to release the pipe section, and then the upper carriage 23 is activated such that it moves co-linearly down the frame 15 with the conjoined pipe joints (22 and 26). Depending on the length of the second pipe joint 26, the alternating grasping and releasing of the upper and lower clamps (18 and 19) and movement of the pipe down the frame 15 with the upper carriage 23 with this activity is repeated until such time the entire second pipe joint 26 is positioned to accept another joint of pipe. The movement of the upper carriage 23 and alternating grasping and releasing of the upper and lower clamps (18 and 19) in this manner pushes the conjoined pipe joints (22 and 26) co-linearly down the frame 15, through the opening of the lower clamp 19 and down the incline and through the trench 14. The downhill end of the first section of pipe 22 is attached to the pilot sled 24. Once the upper end of the second pipe section 26 reaches a position close to the lower clamp 19 it stops. The lower clamp 19 is then activated to grip and hold the conjoined pipe joints (22 and 26). The upper clamp 18 then releases its grip and the upper carriage 23 is again activated such that it moves axially up the frame 15 to return to its original position to receive another joint of pipe.

Figure 11:
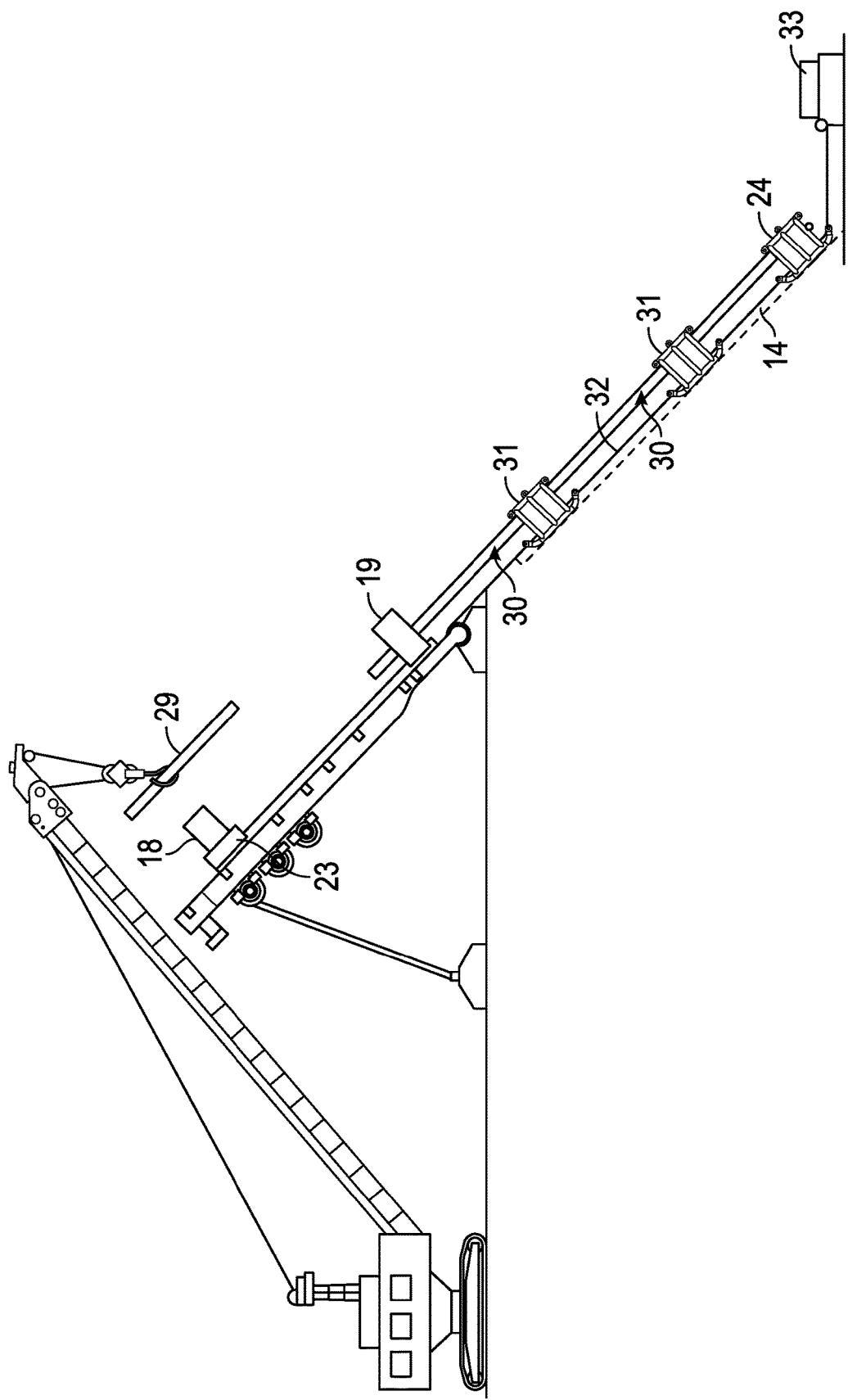
FIG. 11 is a side view of an embodiment of the pipelining operation of the invention, showing heavy equipment assisting in pulling the pipeline assembly and sled assembly down the incline and through the trench with pilot and train sleds in place.

As shown in FIG. 11, further joints of pipe 29 are joined to the pipeline assembly 30 in the same manner as described above, and the pipeline assembly 30 is repeatedly pushed down the incline and through the trench 14 by the force exerted by the upper clamp and upper carriage (18 and 23). Since a section of pipe in the upper clamp 18 might range from 40 to 120 feet in length, the pipe moving apparatus 1 is designed such that the pushing process can take place in steps of 10 to 30 feet simply by disengaging the lower clamp 19 when wishing to push the pipeline assembly 30. Train sleds 31 are periodically added to the pipeline assembly near the end of the pipe moving apparatus 1 to aid to support the pipeline assembly 30 above the bottom of the trench 14 to protect the pipeline's protective coating, and to reduce friction and increase the efficiency of moving the pipeline assembly through the trench 14 and down slope as further joints of pipe 29 are added to the assembly 30. Depending on the size and support requirements of pipe, normally about every 80 to 100 feet a train type sled 31 will placed over a section of pipe and the pipeline engaged and supported by special holding belts on the train sleds 31 as will be discussed in more detail below. Additionally, cables or chains 32 may be attached to the pilot sled 24 and the train sleds 31 to join them together.

In one embodiment, heavy equipment (such as bulldozers or side booms) located on the incline 33 can be used in conjunction with the pipe moving apparatus 1 to assist by pulling and steering the pipeline assembly 30 down the incline and through the trench as illustrated in FIG. 11. In one embodiment, the heavy equipment or a winch is attached from the bottom of the incline by cables or chains 32 to the pilot sled 24. It should be noted, however, that the pipe moving apparatus 1 is designed to function independently in order to push the pipeline assembly 30 down the incline.

Figure 12:
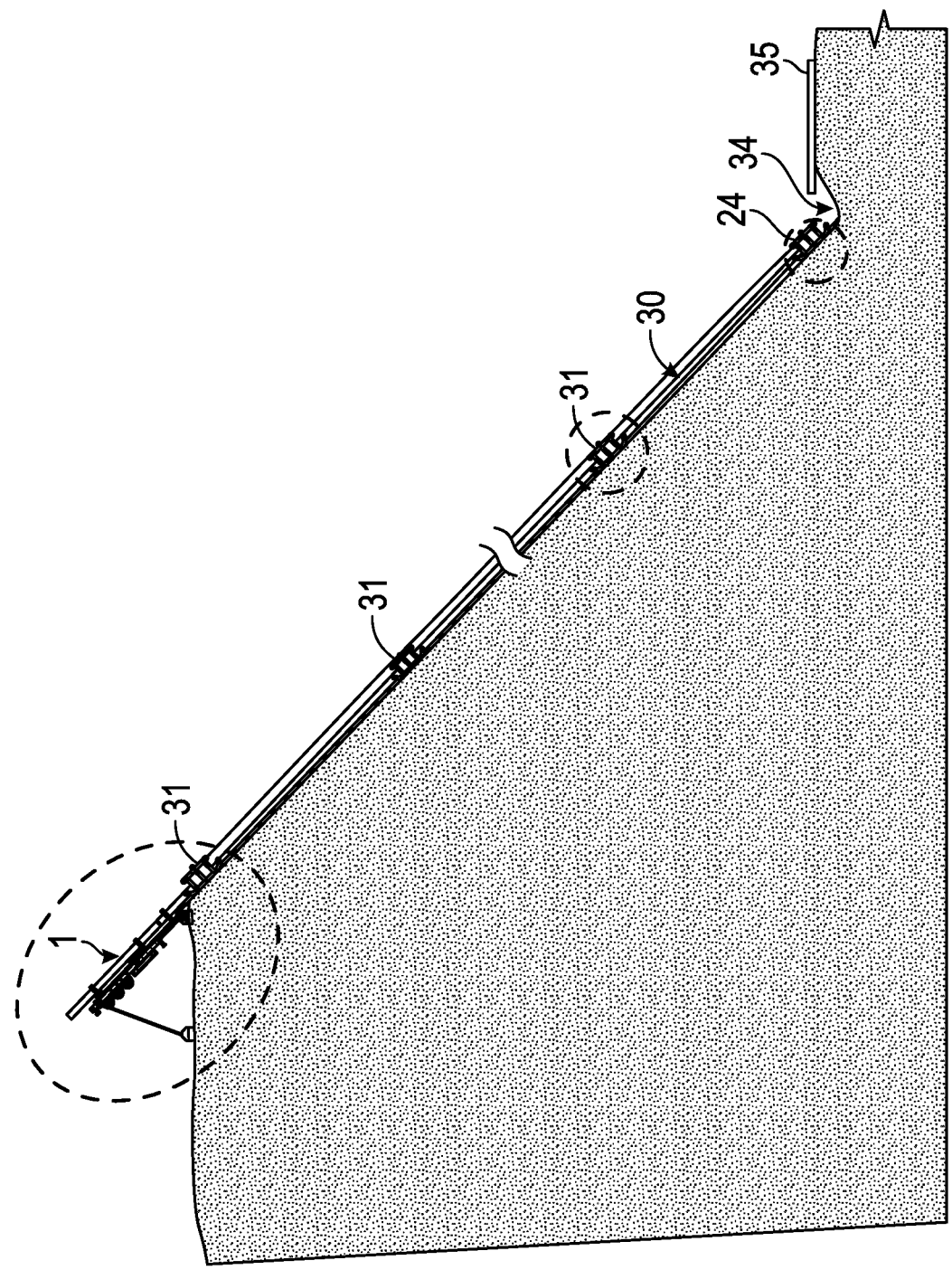
FIG. 12 is a side view of an embodiment of the pipelining operation of the invention, showing the assembled pipeline in its final position.

The foregoing process will be repeated until the pipe is fully in place in the trench down the incline. Once the pipeline assembly 30 is in place down to the bottom of the incline 34, as illustrated in FIG. 12, the pilot sled 24 can be removed and the lower end of the first joint of pipe 18 can be tied into other sections of pipeline 35 on level ground away from the steep terrain using conventional techniques. As further shown in FIG. 13, installation crews (not shown) can install padding material under the pipeline assembly in specified locations in the form of sandbags, sand material or foam 36. In many instances, foam is placed on specified centers, and, as previously described and shown in FIG. 3 the pipe moving apparatus 1 contains one or more winches and cables (8 and 9) to lower a foam application truck or other heavy equipment (not shown) down the mountain with the crew spraying the foam under the pipe at the specified centers. Once the padding and supports 36 are placed under the pipeline, the train sleds 31 can be removed from the pipeline assembly with a side boom and heavy equipment (not shown) can be lowered down the incline to backfill the trench 14. The pipe moving apparatus 1 and other equipment at the top of the slope is disassembled and removed.

II. The Pipelining Equipment

Now that the basic method of pipelining steep terrain disclosed by the invention has been discussed, the individual parts of the preferred embodiments will be further described in detail.

A. Pipe Moving Apparatus

Figure 14:
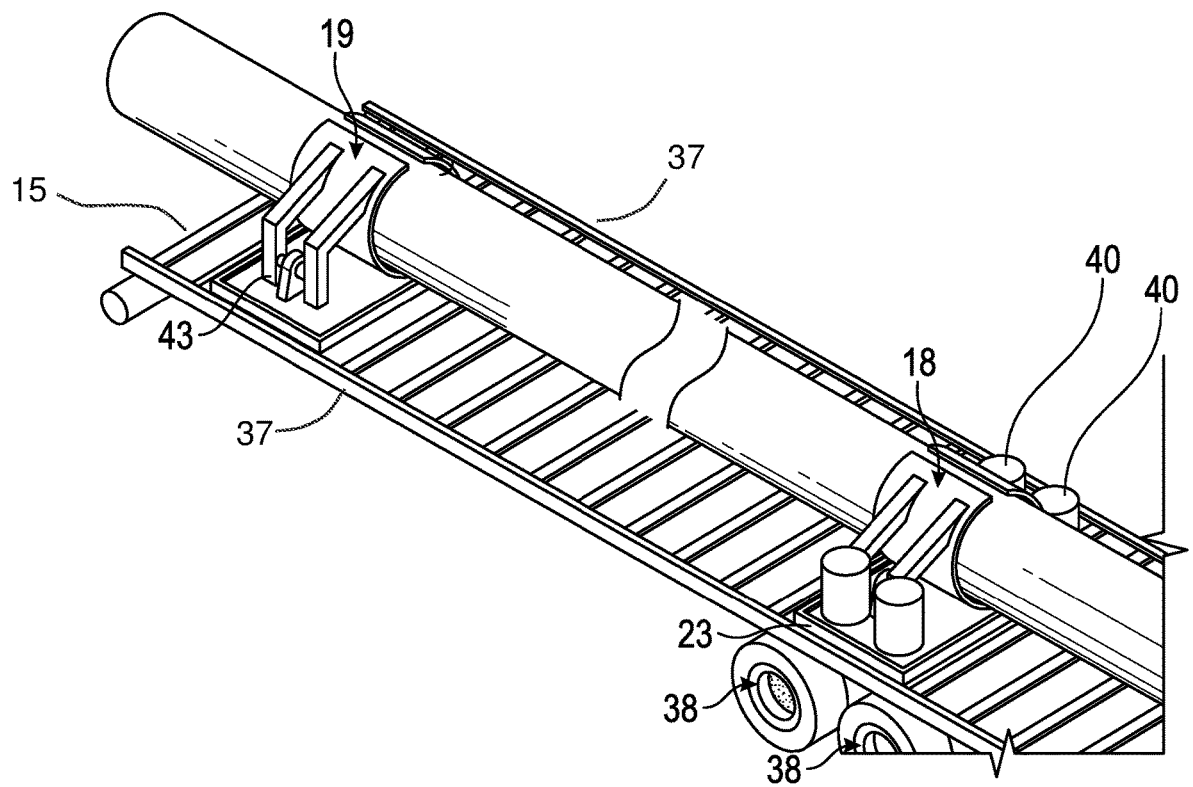
FIG. 14 illustrates a pictorial view of an embodiment of the pipe moving apparatus of the invention.

Referring to FIGS. 4 and 14, in one embodiment, the pipe moving apparatus 1 has a frame 15 consisting of either a single "I" beam or multiple "I" beams 37 to support an upper carriage 23, and upper clamp 18 and lower clamp 19. In the embodiment as illustrated in FIG. 14, the frame 15 is wheel-mounted 38 to facilitate being transported along roads. In other embodiments, the frame 15 may be supported by a tracked undercarriage to facilitate working on various terrain or slopes. The frame 15 is capable of being raised vertically to an elevated position with respect to the slope of the terrain where the pipeline assembly is being installed as illustrated in FIG. 4. The pipe moving apparatus's size length, width, height and weight will vary according to the size of pipeline assembly that is being installed.

i. Clamp Carriage and Clamps

Figure 15:
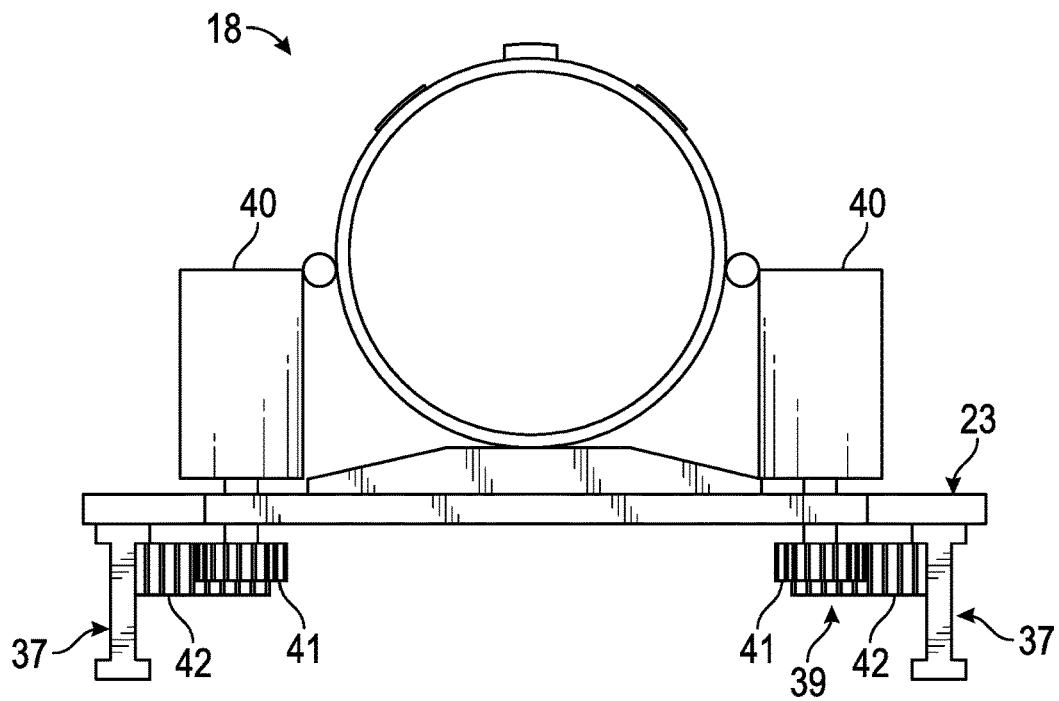
FIG. 15 illustrates a front view of an embodiment of the upper clamp carriage.
Figure 16:
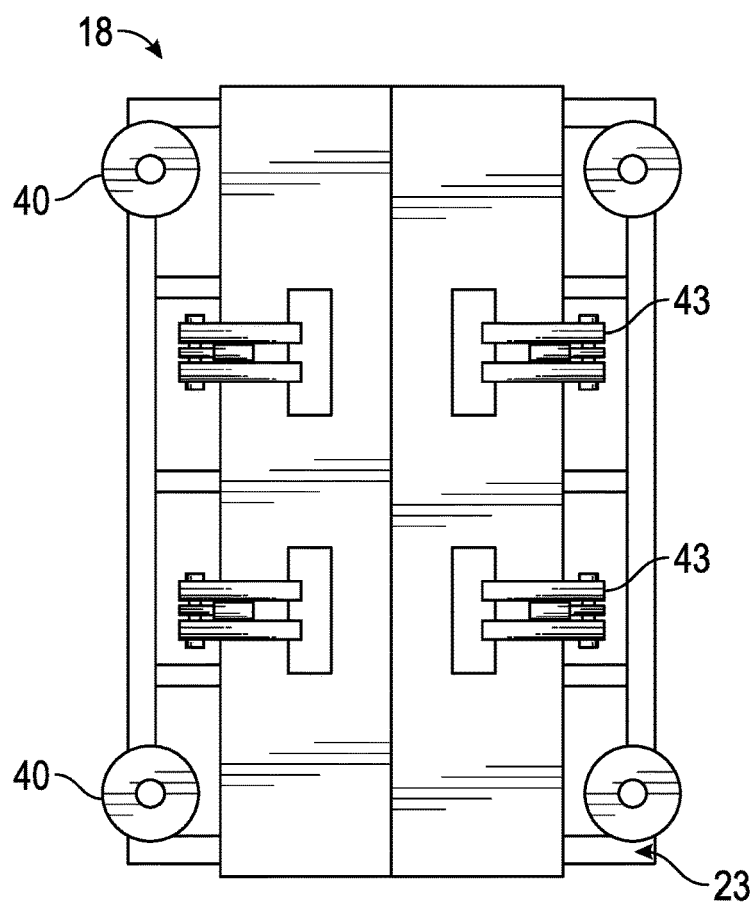
FIG. 16 illustrates a top view of an embodiment of the upper clamp carriage.

Referring to FIGS. 15 and 16 the upper clamp 18 is attached to a clamp carriage 23 which is connected to the upper frame 15 of the pipeline moving apparatus 1. As previously described, the upper clamp carriage 23 is capable of moving co-linearly up and down the frame 15. The upper clamp carriage's 23 main function is to hold the upper clamp 18 while traversing the frame 15 and pushing or pulling pipe sections.

In one embodiment, as illustrated in FIGS. 15 and 16, to accomplish axial movement, the clamp carriage 23 is connected by a rack and pinion system 39 to the upper frame's 15 "I" beams 37, and includes hydraulic motors 40 fixed with pinions 41 to match the "racks" 42 on the "I" beams 37. The upper clamp carriage 23 may have a plurality of hydraulic motors 40 configured to activate hydraulic cylinders 43 to obtain the working force necessary to hold the weight of the pipeline being installed. The size and number of hydraulic motors 40 depends on the working weight of the pipe being installed which is dependent on the diameter and length of pipe.

In one embodiment, the upper clamp 18 may be attached to the upper carriage 23 through ball-and-socket joint (not shown), such that it is able to "float" on two planes, a feature that is essential in order to make the 'butt' welds 27 between pipe joints. The frame 15 also has a lower clamp 19 is connected to the frame 15 to be stationary, but could also have the capability of moving along the "I" beams 37 for short distances using a carriage assembly similar to the upper carriage 23 or hydraulic rams (not shown) to move the lower clamp 19 for short intervals up and down the frame 15.

Figure 17:
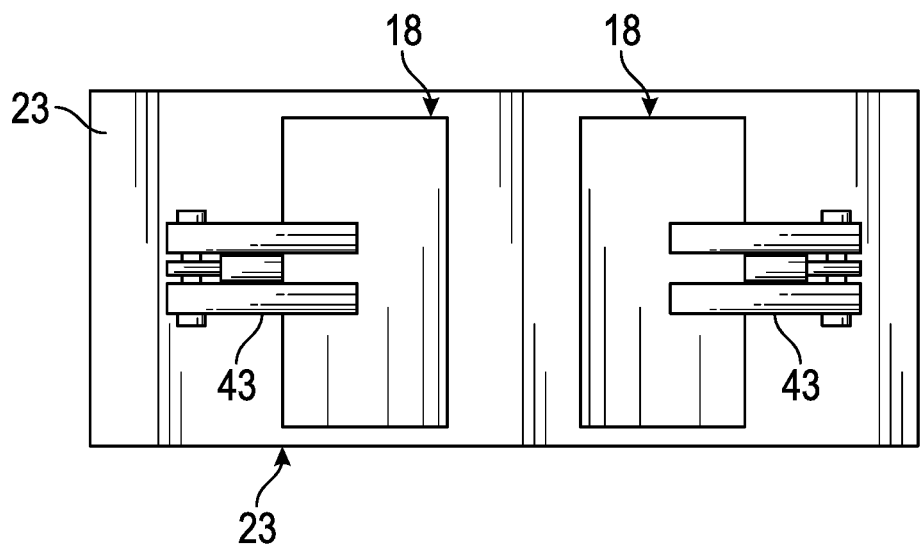
FIG. 17 illustrates a top view of an embodiment of the upper clamp.
Figure 18:
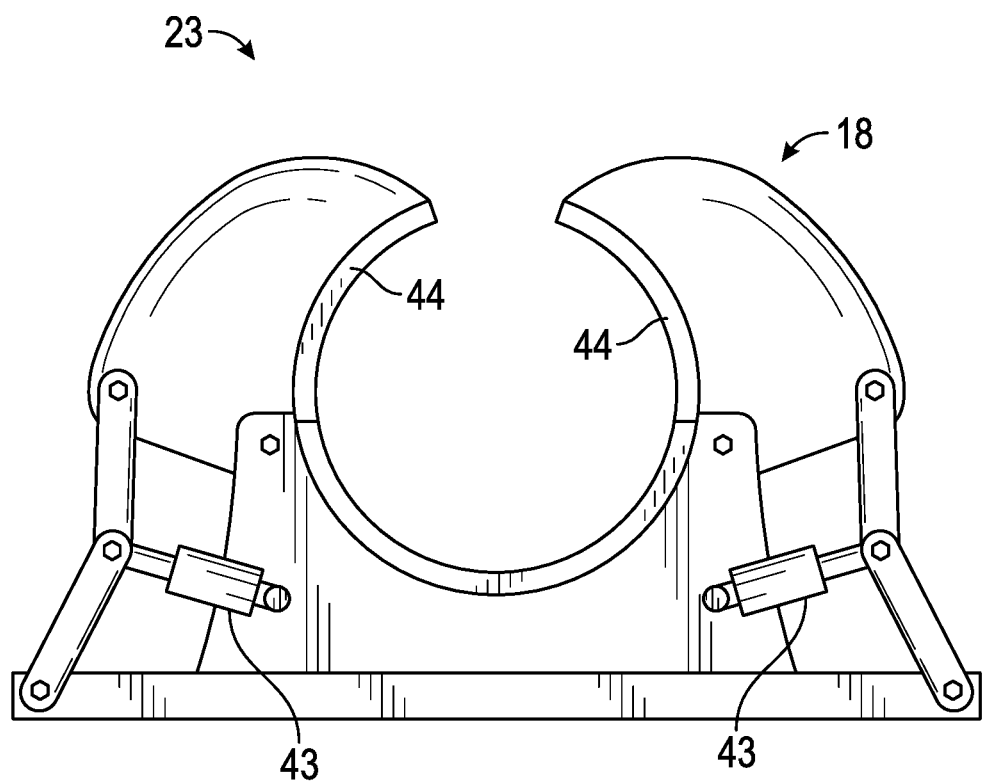
FIG. 18 illustrates a front view of an embodiment of the upper clamp.

Details of the upper clamp (and a preferred embodiment of the lower clamp) are shown in FIGS. 17 and 18.

In one embodiment, as illustrated in FIGS. 17 and 18, the upper clamp 18 is capable of being opened sufficiently such that a section of pipe can be placed in the clamp at any position along the pipe. The upper clamp 18 further uses a plurality of axially arranged hydraulic cylinders 43 that exert an adjustable force on a section of pipe via clamp liners 44 attached to the inside diameter of the upper clamp 18. The clamp liners 44 are fitted with rubber or other gripping material (not shown) having a sufficiently large contact surface relative to the pipe to keep the contact pressure and the shear stress applied on the pipeline section low to protect the pipe's coating and/or abrasive resistant material during operations. The upper clamp 18 can accommodate various pipeline diameters by changing the clamp liners 44. As discussed, the upper clamp 18 may be activated and deactivated by hydraulic cylinders 43 acting to grip and/or release the pipe.

In another embodiment (not shown), the upper clamp 18 is similar to clamping equipment known in the market under the name "Pipe Thruster" (https://www.herrenknecht.com/en/products/additional-equipment/tunnelling-logistics/pipe-thruster.html), although it would have to be adapted to connect to the upper carriage 23. In this embodiment, the upper clamp 18 may attached to the frame 15 through extendible and retractable hydraulic cylinders as used with the "Pipe Thruster."

As discussed, the lower clamp 19, in one embodiment, is similar to the upper clamp 18, and may be either fixed to the frame 15 or fixed on a carriage similar to the upper carriage 23 that is capable of moving axially along the frame 15. The lower clamp 19, like the upper clamp 18 can accommodate various pipeline diameters by changing its clamping liners 44 or by changing the lower clamp 19 itself. Both the upper and lower clamps (18 and 19) may be connected, such as by a ball and socket joint (not shown) to either their carriages such that they can articulate freely in order to match up the ends of the joints of pipe for welding, or directly to the upper frame (in the usual case of the lower clamp 19).

ii. Pilot Sled and Train Sleds

There are two types of sleds utilized with the pipeline moving apparatus—the "pilot sled" 24 and the "train sled" 31 as illustrated in the embodiments in FIGS. 19-22. The sleds' primary function is to facilitate movement of the pipeline assembly 30 down the incline while keeping the pipeline assembly 30 off of the bottom of the trench 14 with such clearance as to protect the pipeline assembly's 30 protective coating and allow installation of padding and/or other supports 36 under the pipeline assembly 30 prior to lowering it in the trench 14 and backfilling. As previously discussed, the sleds (24 & 31) are inserted at the top of the slope 2 near the pipeline moving apparatus 1 during the assembly of the pipeline as it is being pushed down the slope.

As previously illustrated in FIG. 12, the pilot or "lead" sled 24 is used to guide the first joint of pipe 22 attached to the pipeline assembly 30 down the trench 14. The incline of the mountain and the shape and size of the trench 14 controls the direction of the pilot sled 24. A series of train sleds 31 are used to support the pipeline assembly 30, and promote its movement while being pushed down the incline through the trench 14, and protect the pipeline assembly 30 from coating damage. One or more train sleds 31 are positioned on the pipeline assembly 30 in the trench 14, and spaced according to the diameter and weight of the pipeline being installed.

Figure 19:
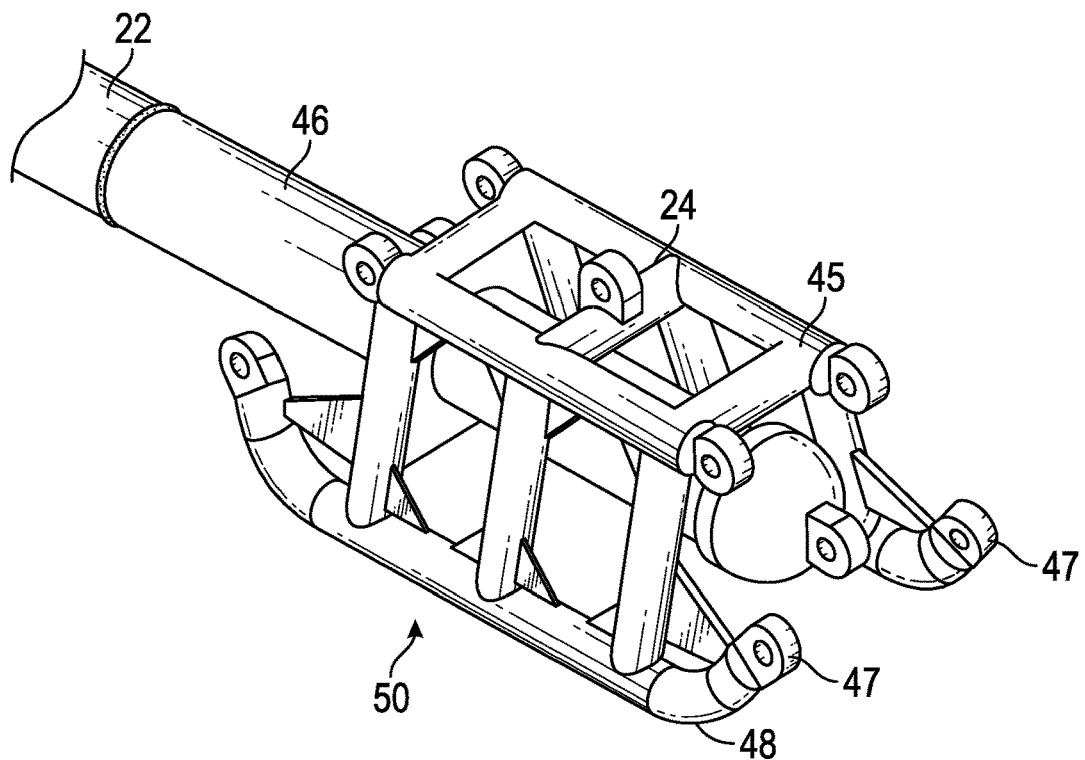
FIG. 19 illustrates a pictorial view of an embodiment of a pilot sled.
Figure 20:
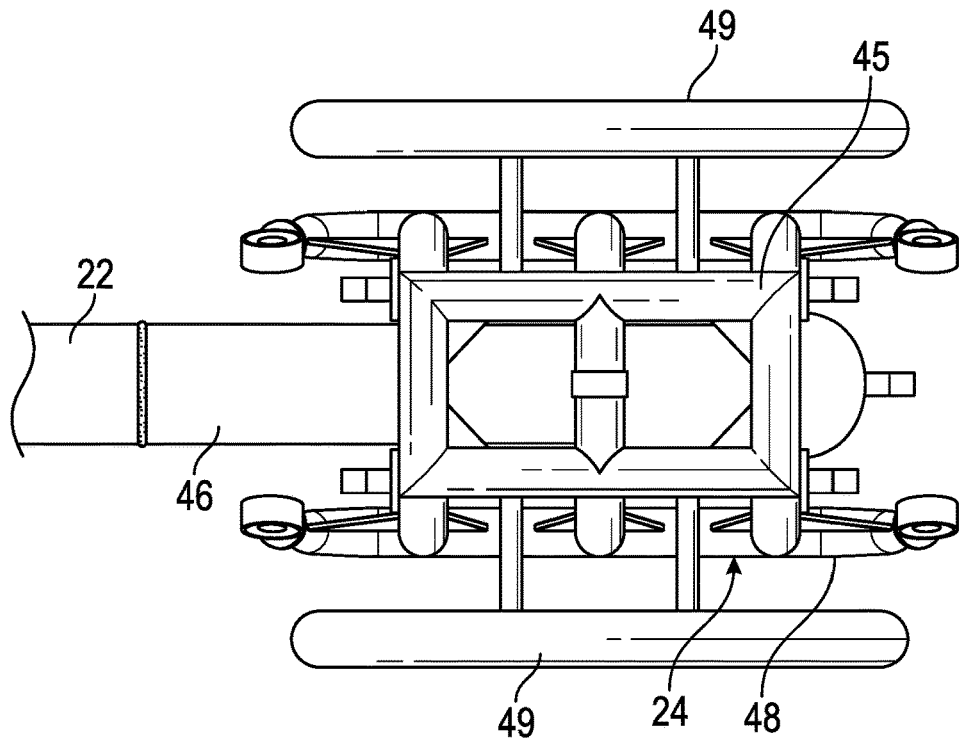
FIG. 20 illustrates a top view of an embodiment of a pilot sled.
Figure 21:
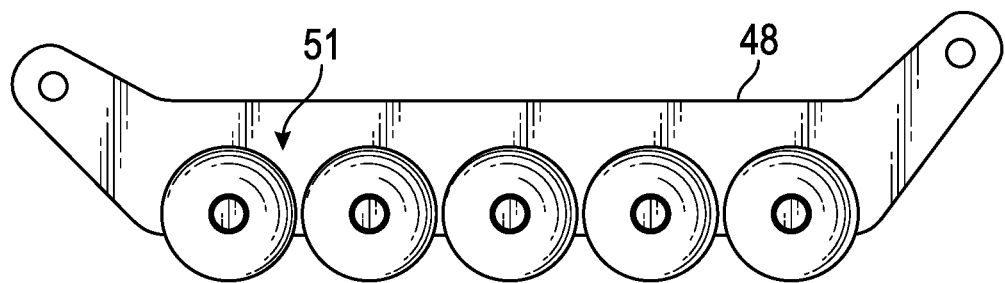
FIG. 21 illustrates a side view of an embodiment of a pilot sled runner with wheels.

Referring to FIGS. 12 and 19-20, the pilot sled 24 comprises a frame 45 having a pipe sleeve 46 attached to the frame 45. The first joint of pipe 22 may be welded to the end of the pipe sleeve 46. Alternatively, the first joint of pipe may be fitted inside the pipe sleeve 46 and secured. The pipe sleeve 46 is secured, as by welding and/or fasteners (not shown), to the frame 45 and, in one embodiment, may be attached to the frame 45 via a coupling system (not shown) that allows the pipe sleeve 46 to slightly rotate without causing the pipeline assembly 30 to torque or force the pilot sled 24 to one side or the other of the trench as the pipeline assembly 30 is being pushed down the slope by the pipe moving apparatus 1 or pulled if one or more pulling eyes 47 are used to help direct the sled down the trench 14. The pilot sled 24 has two or more runners 48 each connected to the frame 45 by welding and/or fasteners (not shown). In one embodiment, as shown in FIG. 19 the pilot sled 24 may have side runners 49 to keep the pipe and pilot sled away from the sides of the trench 14.

The runners 48 of the pilot sled 24 include edges 50 made of Vectran or similar abrasion-resistant material in order to reduce friction and increase slippage. Alternatively, the runners 48 of both the pilot and train sleds 24 and 31 may have wheels 51 attached as show in FIG. 21.

Figure 22:
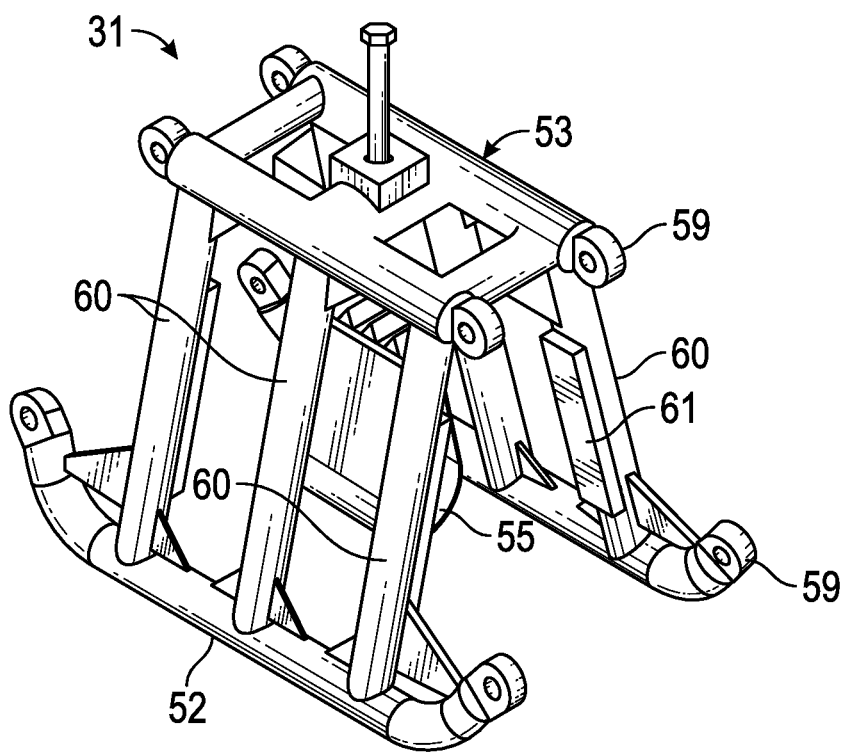
FIG. 22 illustrates a pictorial view of an embodiment of a train sled.
Figure 23:
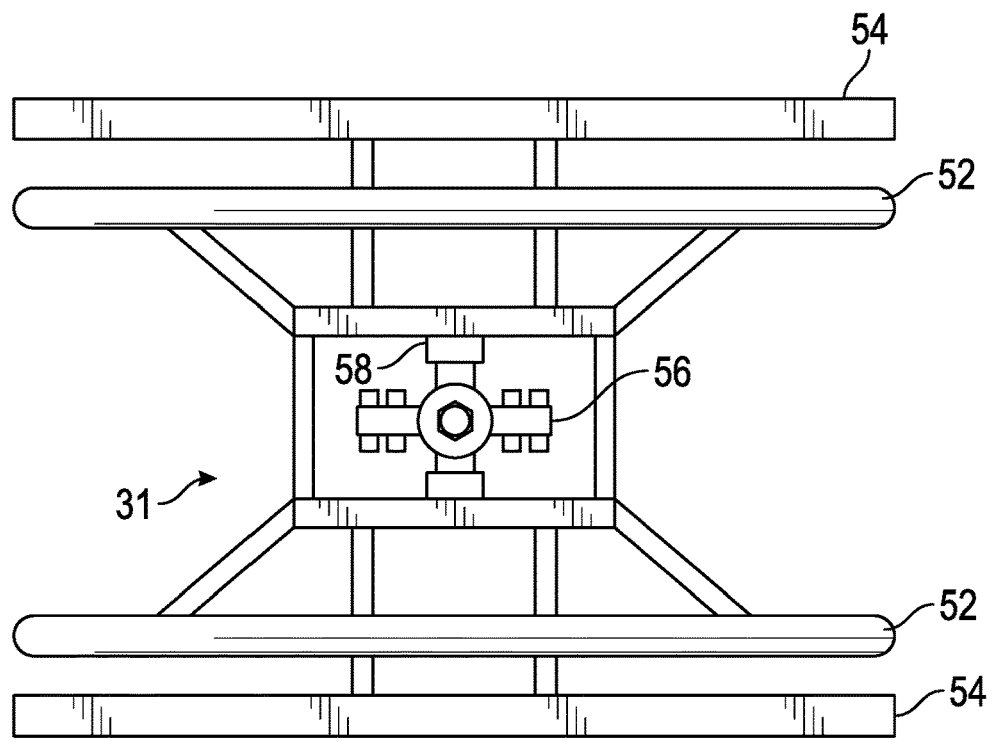
FIG. 23 illustrates a top view of an embodiment of a train sled.

Referring to FIGS. 12 and 22-24, the train sled 31, like the pilot sled 24, consists of at least two runners 52 connected to a frame 53 and, in one embodiment as shown in FIG. 23, side runners 54 as well, to keep the pipeline assembly 30 and train sleds 31 away from the sides of the trench 14. The train sleds 31 are fitted with "lowering-in" belts or cargo straps 55. The frame main vertical support members 60 have a padded bolster 61 to protect the pipe coating when holding the pipeline assembly 30.

Figure 24:
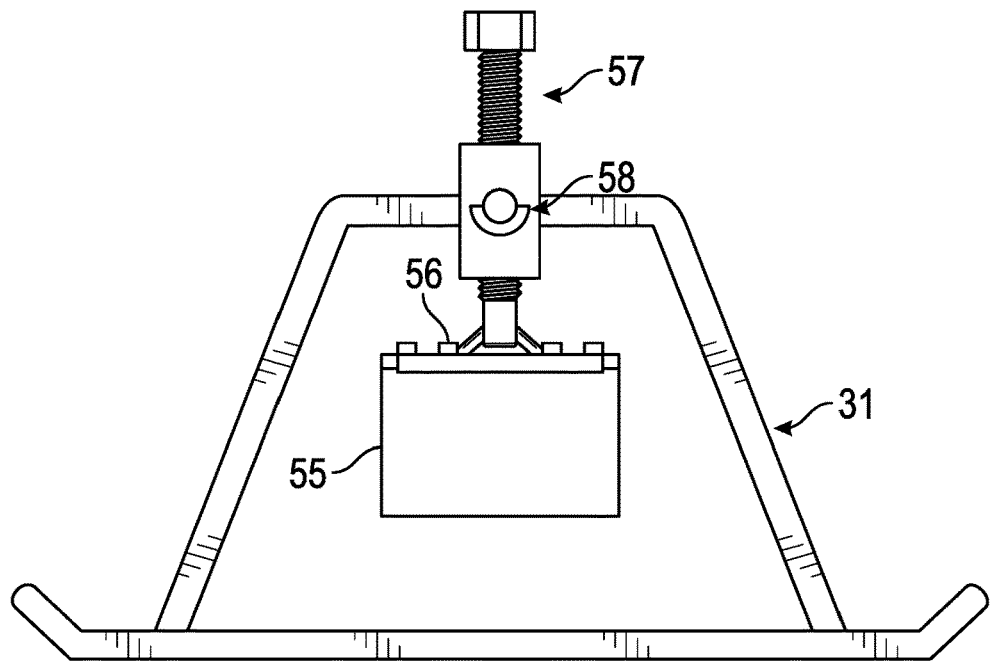
FIG. 24 illustrates a side view of an embodiment of a train sled.

It is preferable to have train sleds 31 that will not only hold the pipeline assembly 30 off the bottom of the trench 14 in such a manner that does not damage the coating but that can be removed once the pipe is in place with relative ease. Lowering-in belts similar to the "lowering-in" belts or cargo straps 55 contemplated for the train sleds 31 have been used for years in cross-country pipeline construction along with side booms. As shown in FIG. 24, the "lowering-in" belts or cargo straps 55 are attached to the train sleds 31 with "bell" hooks, "eye" connections or other types of connectors well known in the art 56. The train sleds 31 are constructed such that they do not have a bottom cross piece, allowing them to be set over the top of the pipe once it in the trench 14. A crane or side boom can be used to hold the pipeline assembly 30 off the bottom of the trench 14 such that workers can attach the "lowering-in" belts 55 around the pipeline assembly 30 and to the train sled 31. The crane or side boom can then lower the pipeline assembly with the belt 55 cradling a joint of pipe 20 and supported by the train sled 31. The train sled 31 can also be lowered by a side boom or crane onto the top of the supported pipeline assembly 30 and the "lowering-in" belt 55 attached.

The "lowering-in" belts or cargo straps 55 can either be fixed or have lowering apparatus 57. If they are fixed they are removed once the complete pipeline assembly 30 is installed and the foam/sand bags 36 have been placed by lowering side booms and/or a side boom and excavator down the slope using the pipe moving apparatus 1 via winches 8 and cables 9. One side boom raises a section of pipe such that the lowering-in belt 55 can be removed. Once the lowering-in belt 55 is released and the train sled 31 connecting cables 32 (as shown in FIG. 11) are disconnected the second side boom or excavator will remove the train sled 31 from over the pipeline assembly 30.

Figure 13:
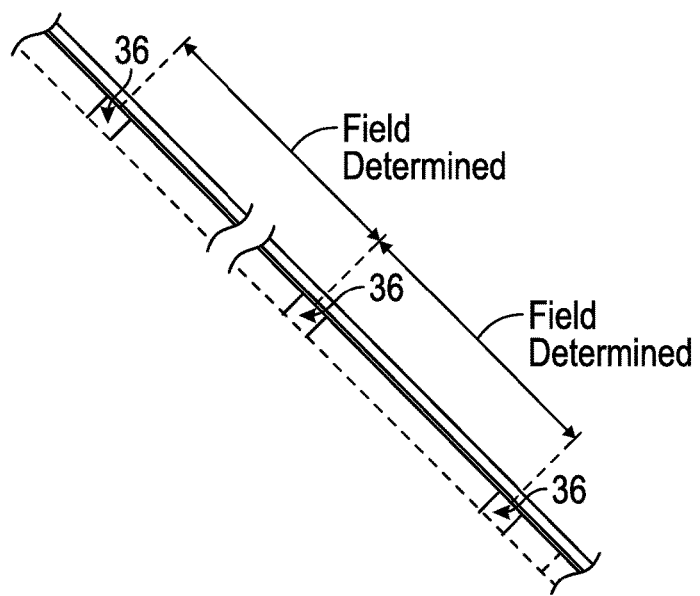
FIG. 13 is a side view of the embodiment of the invention showing the application of foam padding under sections of the pipeline.

Alternatively, the train sleds may be equipped with a lowering apparatus 57 that can be either hydraulically or mechanically driven as shown in FIG. 24. In one embodiment, as shown in FIGS. 23-24, the "lowering-in" belt's bell hook 56 is attached to the train sled 31 with a swivel mechanism 58 that allows the belt to assume the angle of the pipe and slope. The swivel mechanism 58 allows the lowering apparatus 57 to maintain a 90-degree angle to the horizon, which is essential when lowering the pipeline assembly 30 in the trench 14 once it is in position. The lowering apparatus 57 also allows the operator to use the train sleds 31 to lower the pipeline assembly 30 onto the previously prepared padding 36 (as shown in FIG. 13) without the need of a side boom tractor holding the pipe's weight while disconnecting the lowering-in belts 55. Once the weight of the pipeline is off the lowering-in belts 55 and resting on previously prepared padding 36, the lowering-in belts 55 can be easily disconnected and removed using either a side boom tractor or hydraulic excavator.

Like the pilot sled runners 48, the ends of the train sled runners 52 are equipped with hooks/pulling eyes 59 on both ends as shown in FIG. 22. These hooks/pulling eyes 59 are used to connect the sleds 31 in a train-like fashion using cables 32 to maintain the specified spacing. As the pilot sled 24 is pushed down the incline, the remaining train sleds 31 follow connected with the cables 32 at the bottom of the runners 52.

After all the train sleds 31 are removed and the pipeline assembly 30 is resting on the padding 36 and the pipe tie-ins have been completed the pipeline contractor can backfill the trench 14, normally backfilling from the bottom of the slope towards the top. At an appropriate time following the tie-in and backfilling operations the lower and/or upper moveable clamps 18 and 19 on the pipeline moving apparatus 1 can be released.

The above embodiments are exemplary, and it is not intended that this invention be limited to them. Although the inventive material in this disclosure has been described in detail along with some of its technical advantages, it will be understood that various changes, substitutions and alterations may be made to the detailed embodiments without departing from the broader spirit and scope of such inventive material.

Having described presently preferred embodiments of the invention, it may be otherwise embodied within the scope of the following claims.

What is claimed is:
1. A method of laying pipeline down inclined terrain having both a top location and bottom location comprising:
    a) creating an open trench extending from said top location to said bottom location on said inclined terrain;
    b) providing a first section of pipe, having an upper end and a lower end;
    c) attaching a pilot sled assembly to said lower end of said first section of pipe;

d) attaching an additional section of pipe to the upper end of said first section of pipe while holding the sections of pipe from said top location to form attached sections of pipe; and e) pushing said attached sections of pipe down said incline terrain through said open trench towards said bottom location without allowing said attached sections of pipe to contact the bottom of said trench.

2. The method of claim 1 further comprising:

a) attaching an additional section of pipe to the upper end of said attached sections of pipe while holding all attached sections of pipe from said top location;

b) pushing said attached sections of pipe down said incline terrain through said open trench towards said bottom location without allowing said attached sections of pipe to contact the bottom of said trench;

c) repeating steps a) and b) to produce a pipeline extending down said incline terrain from said top location to said bottom location.

3. The method of claim 2 further comprising adding train sled assemblies to the attached sections of pipe at various spaced intervals.

4. The method of claim 3 wherein said pilot sled may be attached to said lower end of said first section of pipe after one or more of said additional sections of pipe are attached to said pipeline.

5. The method of claim 3 or 4 further comprising pulling said pilot sled assembly from a position down said inclined terrain from said pilot sled assembly.

* * * * *